United States Patent
Tao et al.

(10) Patent No.: US 11,581,598 B2
(45) Date of Patent: Feb. 14, 2023

(54) VENTILATION SYSTEM OF ENERGY STORAGE CONTAINER AND ENERGY STORAGE CONTAINER

(71) Applicant: Sungrow Power Supply Co., Ltd., Hefei (CN)

(72) Inventors: Gaozhou Tao, Hefei (CN); Renbin Yu, Hefei (CN); Hao Su, Hefei (CN); Jie Zhou, Hefei (CN); Youjin Yang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 17/364,974

(22) Filed: Jul. 1, 2021

(65) Prior Publication Data
US 2022/0181719 A1     Jun. 9, 2022

(30) Foreign Application Priority Data
Dec. 7, 2020 (CN) .......................... 202022927428.4

(51) Int. Cl.
| | |
|---|---|
| *H01M 10/6562* | (2014.01) |
| *H01M 10/613* | (2014.01) |
| *H01M 10/627* | (2014.01) |
| *H01M 50/209* | (2021.01) |
| *H01M 10/6554* | (2014.01) |

(52) U.S. Cl.
CPC ..... *H01M 10/6562* (2015.04); *H01M 10/613* (2015.04); *H01M 10/627* (2015.04); *H01M 10/6554* (2015.04); *H01M 50/209* (2021.01); *H01M 2220/10* (2013.01)

(58) Field of Classification Search
None
See application file for complete search history.

(56) References Cited

U.S. PATENT DOCUMENTS

2020/0243813 A1 * 7/2020 Zhang ................. H01M 10/657

FOREIGN PATENT DOCUMENTS

CN           207353324     *   5/2018

* cited by examiner

*Primary Examiner* — Lisa S Park
(74) *Attorney, Agent, or Firm* — Wolf, Greenfield & Sacks, P.C.

(57) ABSTRACT

An energy storage container ventilation system and an energy storage container are provided according to the present disclosure. The ventilation system includes an air conditioner, an air duct, and multiple columns of battery racks, and each battery rack includes multiple lines of battery boxes, and an air outlet of the air conditioner is communicated with the air duct, a communicating part of each battery box and the air duct is provided with a ventilation plate with the same structure or different structures. The energy storage container ventilation system of the present disclosure uses an air conditioner to dissipate heat. Ventilation plates are provided at communicating parts of the air duct and each battery box. The structure of each ventilation plate is the same or different, so as to control an air intake volume flowing into each battery box.

9 Claims, 3 Drawing Sheets

VENTILATION SYSTEM OF ENERGY STORAGE CONTAINER AND ENERGY STORAGE CONTAINER

CROSS REFERENCE TO RELATED APPLICATIONS

This application claims the priorities to Chinese patent application No. 202022927428.4, titled "VENTILATION SYSTEM OF ENERGY STORAGE CONTAINER AND ENERGY STORAGE CONTAINER", filed with the China National Intellectual Property Administration on Dec. 7, 2020, the entire disclosure of which is hereby incorporated by reference.

FIELD

The present disclosure relates to the technical field of electrical energy storage, in particular to an energy storage container ventilation system and an energy storage container.

BACKGROUND

With the rapidly increasing proportion of the renewable energy such as solar energy in the power system, the stability of grid connection thereof has become a key issue for new energy power generation technology. The use of the energy storage system may effectively eliminate the day-night peak and off-peak difference, smooth the load, and improve the stability of the grid system operation and the power quality of the grid. With the gradual increase in the application requirements of energy storage system, requirements such as small space occupation, high power density, and mobility have been put forward, so a container energy storage system rises in response to the proper time and conditions. The so-called container energy storage system is to centrally arrange a battery system, an AC/DC converter, a monitoring system in one or more standard containers, and multiple products are delivered to users in an integrated form, which is convenient to be transported and easy to be installed.

The battery system in the energy storage container may generate heat during the charging and discharging process. If the heat cannot be dissipated in time, a battery temperature may continue to rise, which may inevitably affect the stable operation of the system. A current mainstream cooling method is to provide an air duct on the top of a battery pack, which realizes cooling by using coolant input from the air conditioner to absorb heat.

The energy storage container is provided with multiple columns of battery racks, each row of the battery racks includes multiple columns of battery boxes, and the battery boxes are provided with energy storage batteries. In a layout of energy storage container, a single air conditioner is usually used to cool multiple columns of battery racks at the same time, which may inevitably cause uneven air volume distribution among battery racks. In order to evenly distribute the air, designers usually design the top air duct as a stepped or divergent air duct, which is very complicated in structure, and difficult to make optimization adjustments based on actual test results, so the applicability is not desirable.

In addition, an air duct on the back of a current battery rack is usually a cavity. When cold air flows in from the top, a large amount of cold air may accumulate on the bottom of the battery rack due to inertia, resulting in uneven air distribution between the upper and lower battery boxes, which may cause an uneven cooling of each energy storage battery, thus temperature is inconsistent between the energy storage batteries, which aggravates the difference in internal resistance and capacity between the energy storage batteries. After a long time accumulation, the energy storage battery may be overcharged or over-discharged, which may affect the life of the energy storage battery and result in safety hazards.

SUMMARY

An issue addressed by the present disclosure is to evenly distribute the air volume and reduce the temperature difference between the energy storage batteries.

In order to solve the above issue, an energy storage container ventilation system, including an air conditioner, an air duct, and multiple columns of battery racks, is provided by the present disclosure, and the battery rack includes multiple lines of battery boxes, and an air outlet of the air conditioner is communicated with the air duct, where a connecting part of each battery box and the air duct is provided with a ventilation plate with the same or different structure.

Compared with the conventional art, the energy storage container ventilation system of the present disclosure uses an air conditioner to dissipate heat. Ventilation plates are provided at communicating parts of the air duct and each battery box. The structure of each ventilation plate is the same or different, so as to control an air intake volume of each battery box. The air volume is finely controlled, so that the cooling effect of each battery box is basically the same, which reduces the temperature difference between the energy storage batteries, and prolongs the service life.

In a preferred or optional embodiment, the ventilation plate is provided with a hollow ventilation section, and the ventilation section on each ventilation plate has the same structure or different structures. Therefore, by providing the ventilation section on the ventilation plate to control the amount of cold air flowing through the ventilation plate, when the structure of the ventilation section of each ventilation plate is the same or different, the amount of cold air flowing into each battery box may be adjusted to achieve a similar cooling effect for each energy storage battery, which has a better temperature uniformity.

In a preferred or optional embodiment, the ventilation plate includes a shielding sheet, which is adapted to shield the ventilation section to adjust a ventilation area of the ventilation plate. Therefore, the shielding sheet is capable of adjusting a ventilation area of each ventilation plate, thereby realizing a precise control for the temperature of each energy storage battery.

In a preferred or optional embodiment, the ventilation section includes one or more ventilation holes. Therefore, the ventilation plate adjusts the ventilation area by setting different numbers of ventilation holes to control the amount of cold air flowing through the ventilation plate.

In a preferred or optional embodiment, the ventilation hole is in form of a round hole, a polygonal hole, a strip hole or a grid hole. Therefore, the structure of the ventilation section is not limited, and ventilation holes with different structures are provided to not only adjust cold air volume, but also adjust the wind speed, so as to control the temperature in the battery box.

In a preferred or optional embodiment, the ventilation plate is rotatably provided, and when a rotation angle of the ventilation plate is 0 degree, the ventilation plate is perpendicular to the battery rack. Therefore, the ventilation plate may be rotated to adjust the inclination angle, and the amount of cold air flowing into each battery box may be controlled, so as to achieve a precise control for the temperature of each energy storage battery.

In a preferred or optional embodiment, the ventilation plate is adapted to rotate upward or downward along a rear side edge of the ventilation plate. Therefore, a rotation axis and a rotation direction of the ventilation plate are limited, so as to avoid interference when the ventilation plate rotates.

In a preferred or optional embodiment, the maximum rotation angle of the ventilation plate is 90 degrees. Therefore, the ventilation plate is capable of rotating a large angle to meet the air volume control requirements. When the ventilation plate is rotated to the maximum rotation angle, it is parallel to the battery rack, which is equivalent to no the ventilation plate being provided and the ventilation volume is increased.

In a preferred or optional embodiment, the air duct includes a first air duct and multiple second air ducts, and the first air duct is arranged above the battery racks; and the air outlet of the air conditioner is communicated with the first air duct, and each column of the battery racks is communicated to one of the second air ducts; the first air duct is communicated to the second air duct. Therefore, cold air delivered from the air conditioner may enter each battery rack and each battery box along the first air duct and the second air duct to ensure the heat dissipation effect.

An energy storage container is further provided by the present disclosure, including the above energy storage container ventilation system.

Compared with the conventional art, the energy storage container of the present disclosure has an energy storage container ventilation system, which controls the amount of cold air entering each battery rack and each battery box through the ventilation plate, thereby reducing the temperature difference between the energy storage batteries, prolonging the service life. The structure of the ventilation plate is simple, which can be flexibly adjusted, and has a desirable control effect on the amount of cold air. It is no need to design a complicated air duct structure, and the production cost is low.

REFERENCE NUMERALS IN FIGS. 1 TO 8

Figure 1:
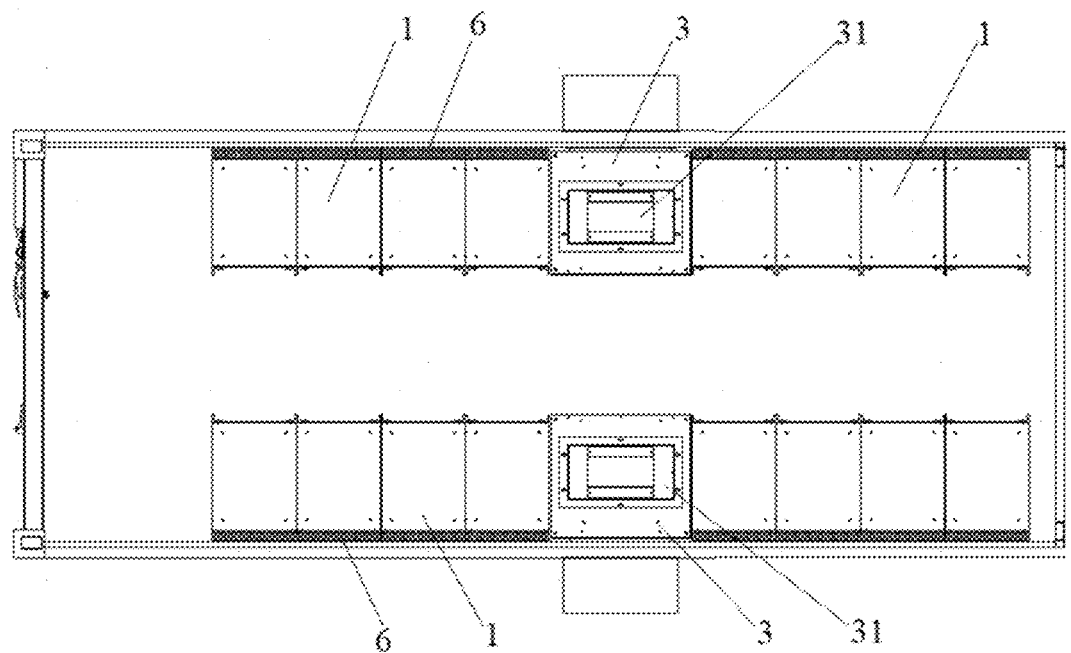
FIG. 1 is a top view of an energy storage container ventilation system according to an embodiment of the present disclosure.

1—battery rack, 2—battery box, 3—air conditioner, 31—air outlet, 32—return air inlet, 4—first air duct, 5—second air duct, 6—ventilation plate, 61—ventilation hole, 62—shielding sheet.

DETAILED DESCRIPTION OF THE EMBODIMENTS

The technical solutions in the embodiments of the present disclosure are described clearly and completely in conjunction with the drawings in the embodiments of the present disclosure hereinafter, so that objects, technical solutions and advantages of the embodiments of the present disclosure are clearer. Apparently, the described embodiments are only a part of the embodiments of the present disclosure, not all embodiments. The components of the embodiments of the present disclosure, which are generally described and illustrated in drawings herein, may be arranged and designed in various different configurations.

Therefore, the following detailed description of the embodiments of the present disclosure provided in the accompanying drawings is not intended to limit the scope of the claimed present disclosure, but merely represents selected embodiments of the present disclosure. All the other embodiments obtained by those skilled in the art based on the embodiments of the present disclosure without creative efforts will fall within the protection scope of the present disclosure.

It should be noted that similar reference numerals and letters indicate similar items in the following drawings. Therefore, once an item is defined in one drawing, the item is not required to be further discussed in subsequent drawings.

In the description of the present disclosure, it should be noted that the terms "up", "down", "left", "right", "in", "out", "front", "back" indicate an orientation or positional relationship based on the orientation or positional relationship shown in the drawings, or the orientation or positional relationship that is generally placed in utilization of the present disclosure. It is only for the convenience of describing the present disclosure and simplifying the description, rather than indicating or implying a device or an element must have a specific orientation or be constructed and operated in a specific orientation, and therefore may not be understood as a limitation of the present disclosure.

In the description of the present disclosure, it should be pointed out that, unless otherwise specified and limited, terms such as "set", "install" and "connect" should be understood broadly. For example, the connection may in forms of fixed, detachable or integrated, mechanical or electrical, directly or indirectly through intermediate media, or connected internally by two components. For those skilled in the art, the specific meaning of the above terms in the present disclosure may be understood in the light of specific circumstances.

Hereinafter, some embodiments of the present disclosure will be described in detail with reference to the accompanying drawings. The embodiments and features in the embodiments may be combined with each other without a conflict.

An energy storage container is provided by the embodiment, which is used for power supply from a power grid, and has advantages of small footprint, high power density, and convenient for transportation. The energy storage container includes a ventilation system. The energy storage container is provided with multiple energy storage batteries. The ventilation system is configured to dissipate heat in the energy storage container, and cool the energy storage battery, which ensures the stable operation of the system.

Figure 2:
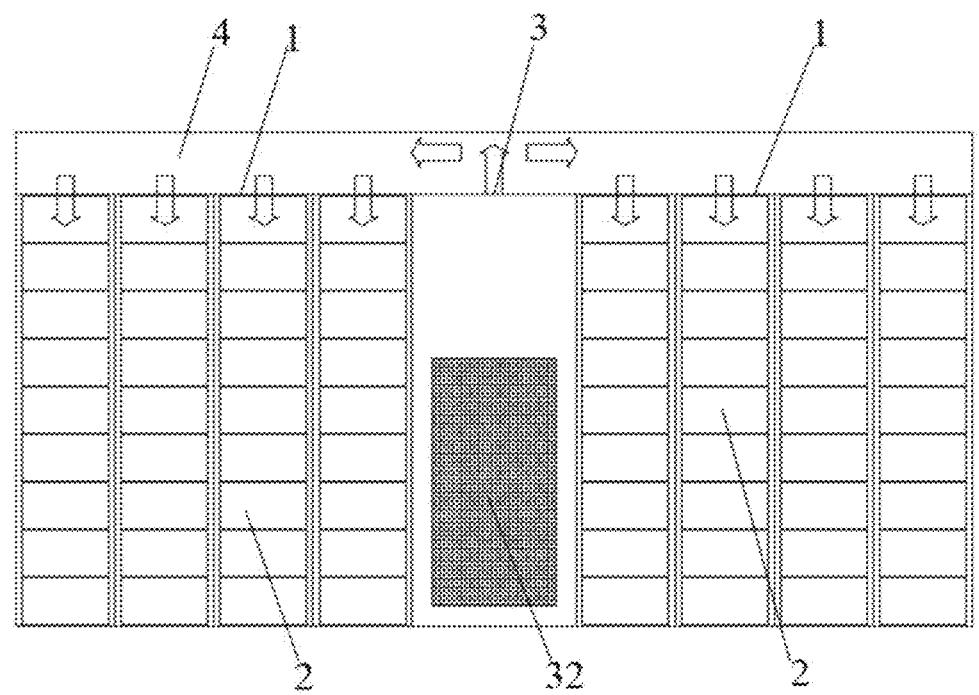
FIG. 2 is a schematic diagram of a backside structure of an energy storage container ventilation system according to the embodiment of the present disclosure.

As shown in FIG. 1 and FIG. 2, the energy storage container ventilation system in the embodiment includes an air conditioner 3, an air duct, and multiple columns of battery racks 1. The multiple columns of battery racks 1 are arranged in a left to right direction, and each column of battery racks 1 includes multiple rows of battery boxes 2 arranged in a up and down direction. Each battery box 2 is configured to install an energy storage battery. The air conditioner 3 is configured to generate cold air to cool the energy storage battery. A top of the air conditioner 3 is provided with an air outlet 31 through which cold air is blown out, and a return air inlet 32 is provided on the back, through which external air flows into the air conditioner 3.

The air duct includes a first air duct 4 and multiple second air ducts 5 communicated with the first air duct 4. The first air duct 4 is located above the battery rack 1, and the air outlet 31 of the air conditioner 3 is in communication with the first air duct 4. As shown in FIG. 2, arrows in the figure indicate a direction of cold air flow. The first air duct 4 is a long channel with no obstruction in the middle. The cold air from the air conditioner 3 may flow to each battery rack 1 along the first air duct 4. One second air duct 5 is provided on the back of each battery rack 1, and adjacent second air ducts 5 are separated by a baffle and are independent of each other. The second air duct 5 is a channel which extends up and down. Each battery box 2 on the battery rack 1 is communicated with the second air duct 5. The cold air flowing in the second air ducts 5 may flow to the battery boxes 2, so that the energy storage batteries installed inside the battery boxes 2 are cooled.

A communicating part of each second air duct 5 and the first air duct 4 is provided with a ventilation plate 6, which is configured to control the air intake volume of the second air duct 5 in each column of battery racks 1. The structure of the ventilation plate 6 on each battery rack 1 may be the same or different. For example, the ventilation plate 6 is provided with multiple ventilation holes 61 of different structures. The closer the ventilation plate 6 to the air conditioner 3 is, the smaller the ventilation hole area thereof is; or the ventilation plates 6 are provided with different inclination angles, the closer the ventilation plate 6 to the air conditioner 3 is, the smaller the inclination angle between the ventilation plate 6 and the battery rack 1 is, so as to control the air intake volume flowing into each second air duct 5, thus, the air volume distribution between the battery racks 1 is even, and the cooling effect is basically the same.

As shown in FIG. 1 and FIG. 2, in the embodiment, the air conditioner 3 is located between multiple columns of battery racks 1. The battery racks 1 on the left and right sides of the air conditioner 3 have the same number of columns. The amount of cold air flowing to the left and right sides of the air conditioner 3 are basically the same. The battery racks 1 are symmetrically located on both sides of the air conditioner 3, which may improve the temperature uniformity of the battery racks 1.

In other embodiments, the air conditioner 3 may be located between multiple columns of battery racks 1. The battery racks 1 on the left and right sides of the air conditioner 3 may have different number of columns. The air conditioner 3 may also be directly located on the left or right side of the multiple columns of battery racks 1. The ventilation plate 6 distributes the amount of cold air entering each leeward air duct. The air conditioner 3 may also be located at other positions of the energy storage container, as long as it ensures the air outlet 31 of the air conditioner 3 to be communicated with the first air duct 4.

Figure 3:
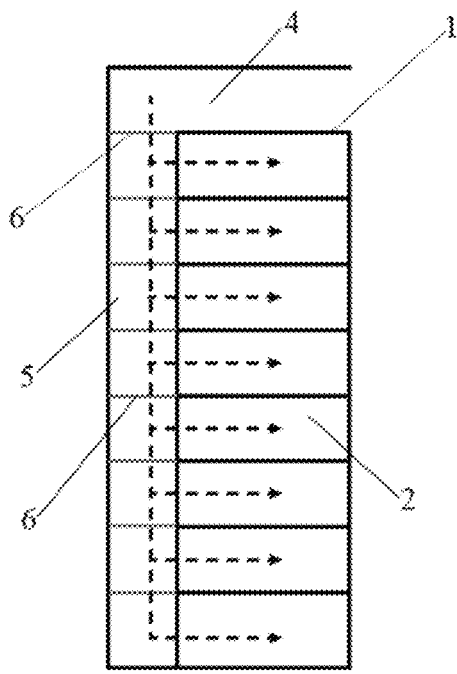
FIG. 3 is a schematic diagram of a cold air flow direction on a left side of an energy storage container ventilation system according to the embodiment of the present disclosure.

As shown in FIGS. 1 to 3, another energy storage container is further provided by the present disclosure, including a ventilation system. The ventilation system includes an air conditioner 3 and multiple columns of battery racks 1 arranged from the left to right. Each column of battery racks 1 includes multiple lines of battery boxes 2 arranged from the top to bottom, which are configured to install energy storage batteries. The air conditioner 3 is located between the multiple columns of battery racks 1, a top of the air conditioner 3 is provided with an air outlet 31, and a backside thereof is provided with a return air inlet 32. A first air duct 4 is provided above the battery rack 1, which is communicated with the air outlet 31 of the air conditioner 3, and a second air duct 5 is provided on the backside of each battery rack 1.

As shown in FIG. 3, a communicating part of each second air duct 5 and the first air duct 4 is provided with a ventilation plate 6, and a communication part of each battery box 2 and the second air duct 5 is further provided with a ventilation plate 6. The structure of each ventilation plate 6 may be the same or different. For example, the ventilation plate 6 is provided with ventilation holes 61 in different structures, the lower the ventilation plate 6 locates, the smaller the area of the ventilation hole is. Or the ventilation plate 6 is provided with different inclination angles, the closer the ventilation plate 6 to the air conditioner 3 is, the smaller the inclination angle between the ventilation plate 6 and the battery rack 1 is, so as to control an air intake volume flowing into each battery box 2. The dotted lines and arrows in FIG. 3 indicate a flow direction of cold air. The ventilation system of the energy storage container provided by the embodiment controls the air intake volume of each battery box 2 through the ventilation plate 6 so that the cooling effect of each battery box 2 is basically the same.

As shown in FIGS. 2 and 3, when the energy storage container ventilation system in the embodiment is working, cold air blows out from the air outlet 31 of the air conditioner 3, flows into the first air duct 4, and then enters the second air duct 5 from the top of each battery rack 1. After that, the cold air flows into each battery box 2 to absorb heat to cool the energy storage battery in each battery box 2, and finally the heated cold air flows back to the air conditioner 3 through the return air inlet 32 of the air conditioner 3 to realize air circulation. Since distances between each battery rack 1 and the air outlet 31 of the air conditioner 3 are different, the ventilation plate 6 capable of adjusting the air intake volume can be arranged on the top of each second air duct 5 to achieve uniform air distribution among the battery racks 1. Similarly, when cold air enters the second air duct 5, due to inertia, a large amount of cold air may gather at the bottom of the second air duct 5, resulting in more cold air entering the battery boxes 2 at the bottom and less cold air entering the battery boxes 2 at upper area. In order to realize the uniform distribution of cold air volume among the battery boxes 2, the ventilation plate 6 capable of adjusting the air volume is provided at the connecting part of each battery box 2 and the second air duct 5 to control the amount of cold air flowing into each battery box 2, so as to reduce the temperature difference between the energy storage batteries, which extends the service life of the energy storage container.

As shown in FIG. 3, each ventilation plate 6 of the energy storage container ventilation system in the embodiment is arranged horizontally. The ventilation plate 6 is provided with a hollow ventilation section and the ventilation section on each ventilation plate 6 have the same or different structures. By changing the structure of the ventilation section, the amount and speed of the cold air flowing through the ventilation plate 6 may be controlled, so that the cooling effects of the energy storage batteries are similar and the temperature uniformity is better.

Figure 4:
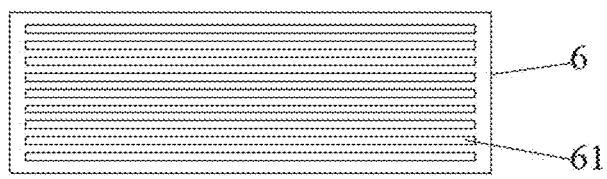
FIG. 4 is a first structural schematic diagram of a ventilation plate according to the embodiment of the present disclosure.
Figure 5:
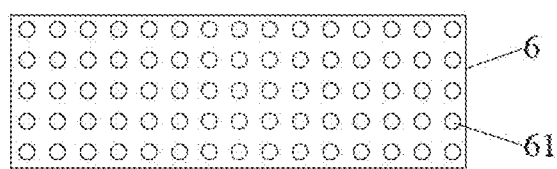
FIG. 5 is a second structural schematic diagram of a ventilation plate according to the embodiment of the present disclosure.
Figure 6:
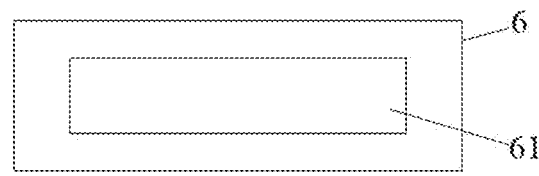
FIG. 6 is a third structural schematic diagram of a ventilation plate according to the embodiment of the present disclosure.

The structure of the ventilation section on each ventilation plate 6 is not limited. It may include multiple strip-shaped ventilation holes 61 as shown in FIG. 4; or, it may include multiple circular ventilation holes 61 as shown in FIG. 5; or, it may include one rectangular ventilation hole 61 as shown in FIG. 6; or, it may include one or more polygonal holes, grid holes, etc. The ventilating sections with different structures are not only capable of adjusting the amount of cold air passing through the ventilation plate 6, but also capable of adjusting the wind speed to better control the cooling effect.

Figure 7:
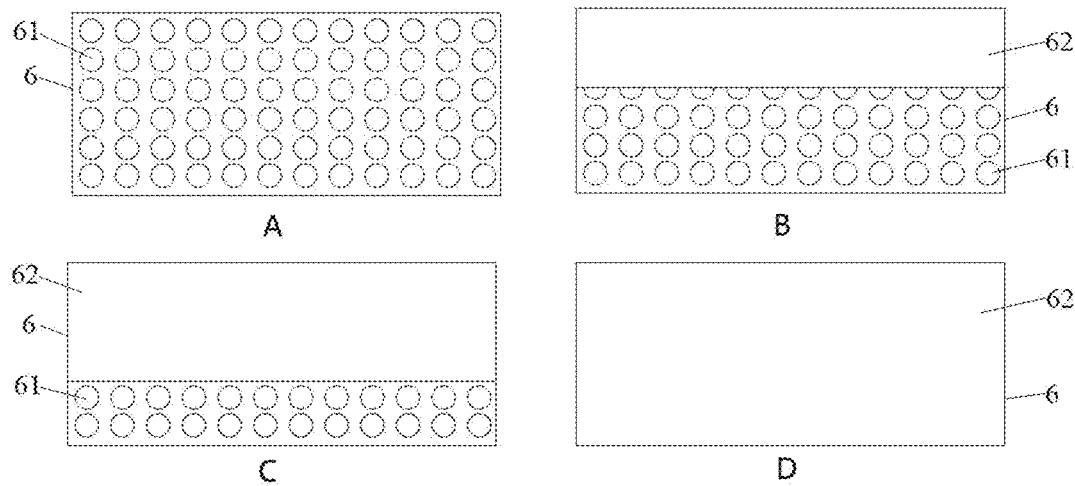
FIG. 7 is a schematic diagram of adjustment states of ventilation area of a ventilation plate according to the embodiment of the present disclosure.

The present embodiment is based on the above embodiments. The ventilation plate 6 includes a shielding sheet 62 for shielding the ventilation section to adjust a ventilation area of the ventilation plate 6. The adjustment states of the shielding sheet 62 are shown in FIG. 7. In the figure, A is a structural diagram of the ventilation plate 6 when the shielding sheet 62 does not shield the ventilating section. D is a structural diagram of the ventilation plate 6 when the shielding sheet 62 completely shields the ventilating section. B and C are the structural diagrams of the ventilation plate 6 when the shielding sheet 62 partially shields the ventilation section. By varying the position of the shielding sheet 62, the ventilation area of the ventilation plate 6 can be accurately adjusted, thereby controlling the air intake volume flowing into each energy storage container, and improving temperature control accuracy of the energy storage battery.

Another energy storage container provided by the embodiment, including a ventilation system. The ventilation system includes an air conditioner 3 and multiple columns of battery racks 1. Each column of battery racks 1 includes multiple lines of battery boxes 2 arranged from the top to bottom. Each battery box 2 is configured to install the energy storage battery. The air conditioner 3 is located on a side of multiple columns of battery racks 1, a top of the air conditioner 3 is provided with an air outlet 31, and a backside thereof is provided with a return air inlet 32. A first air duct 4 is provided above the battery rack 1, which is communicated with the air outlet 31 of the air conditioner 3, and one second air duct 5 is provided on a backside of each battery rack 1.

A communicating part of each second air duct 5 and the first air duct 4 is provided with a ventilation plate 6, and a communicating part of each battery box 2 and the second air duct 5 is further provided with a ventilation plate 6. The ventilation plate 6 is a completely closed board body. The ventilation plate 6 is rotatably provided, so as to adjust the inclination angle by rotating, thereby controlling the amount of cold air flowing into each battery rack 1 and each battery box 2 and achieving a precise control for the temperature of each energy storage battery.

Figure 8:
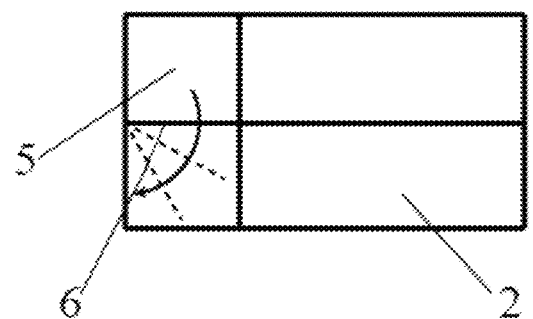
FIG. 8 is a schematic diagram of adjustment states of rotation of a ventilation plate according to the embodiment of the present disclosure.

As shown in FIG. 8, when a rotation angle of the ventilation plate 6 is 0 degree, the ventilation plate 6 is perpendicular to the battery rack 1. An arrow in the figure indicates the rotation direction of the ventilation plate 6, and a dotted line indicates a position when the ventilation plate 6 is rotated to a certain angle. The ventilation plate 6 is capable of rotating up or down along a rear edge to limit the rotation axis and direction of the ventilation plate 6, so as to avoid interference when each ventilation plate 6 rotates.

The maximum rotation angle of the ventilation plate 6 is 90 degrees. When the ventilation plate 6 is rotated to the maximum rotation angle, it is parallel to the battery rack 1, which is equivalent to no ventilation plate 6 being provided, so as to improve the ventilation effect. In the embodiment, a range of the rotation angle of the ventilation plate 6 is large, which meets the requirements of air volume control.

Another energy storage container provided by the embodiment, including a ventilation system. The ventilation system includes an air conditioner 3 and multiple columns of battery racks 1. Each column of battery racks 1 includes multiple lines of battery boxes 2 arranged from the top to bottom. Each battery box 2 is configured to install the energy storage battery. The air conditioner 3 is arranged between multiple columns of battery racks 1, a top of the air conditioner 3 is provided with an air outlet 31, and a backside thereof is provided with a return air inlet 32. A first air duct 4 is provided above the battery rack 1, which is communicated with the air outlet 31 of the air conditioner 3, and one second air duct 5 is provided on a backside of each battery rack 1.

A communicating part of each second air duct 5 and the first air duct 4 is provided with a ventilation plate 6, and a communicating part of each battery box 2 and the second air duct 5 is further provided with a ventilation plate 6. The ventilation plate 6 is provided with a hollow ventilation section, which have different structures on each ventilation plate 6. The ventilation plate 6 includes a shielding sheet 62 for shielding the ventilation section to adjust a ventilation area of the ventilation plate 6. Further, the ventilation plate 6 is rotatably provided to adjust an inclination angle by rotating.

During the operation of the energy storage container ventilation system in the embodiment, the ventilation area of each ventilation plate 6 and the inclination angle of the ventilation plate 6 may be adjusted according to the actual cooling situation, so as to adjust the amount of cold air flowing into the corresponding battery box 2, thereby achieving precise control of the temperature of each battery box 2.

The energy storage container provided by the above embodiments has the ventilation system, and the amount of cold air entering each battery rack 1 and each battery box 2 is controlled through the ventilation plate 6, thereby reducing the temperature difference between the energy storage batteries and prolonging the service life. The ventilation plate 6 has a simple structure, which may be adjusted flexibly. The control effect of the cold air volume is desirable. Further, there is no need to design a complicated stepped or divergent air duct, and the production cost is low, so it has good practical value and disclosure promotion prospects.

In the description of the specification, the description with reference to the terms "embodiment", "an embodiment", "an implementation manner" means that the specific features, structures, materials or characteristics described in conjunction with the embodiment or implementation are included in at least one embodiment or implementation manner of the present disclosure. In the specification, schematic expressions of the above terms do not necessarily refer to the same embodiments or implementation manners. Furthermore, the specific features, structures, materials or characteristics described may be combined in any one or more embodiments or implementation manners in an appropriate way.

Finally, it should be stated that, the above embodiments are only intended for illustrating the technical solutions of the present disclosure rather than limiting the present disclosure. Although the present disclosure is illustrated in detail with reference to the embodiments described above, it should be understood by those skilled in the art that, modifications may still be made to the technical solutions recited in the embodiments described above, or equivalent substitutions may be made onto a part or all of the technical features of the technical solutions. While such modifications or substitutions will not cause the essence of corresponding technical solutions to depart from the scope of the technical solutions of the embodiments of the present disclosure.

The invention claimed is:

1. An energy storage container ventilation system, comprising an air conditioner, an air duct, and a plurality of columns of battery racks, wherein each column of the battery racks comprises a plurality of lines of battery boxes, and an air outlet of the air conditioner is connected with the air duct, a plurality of ventilation plates is provided at connecting positions of each battery box and the air duct, and the plurality of ventilation plates is of a same structure or different structures, and the plurality of ventilation plates is rotatably provided, and when a rotation angle of the plurality of ventilation plates is 0 degree, the plurality of ventilation plates is perpendicular to a corresponding battery rack.

2. The energy storage container ventilation system according to claim 1, wherein each of the plurality of ventilation plates is provided with a ventilation section which is hollow and the ventilation section on each ventilation plate has the same structure or different structures.

3. The energy storage container ventilation system according to claim 2, wherein each ventilation plate comprises a shielding sheet, which is adapted to shield the ventilation section to adjust a ventilation area of the ventilation plate.

4. The energy storage container ventilation system according to claim 3, wherein the ventilation section comprises one or more ventilation holes.

5. The energy storage container ventilation system according to claim 4, wherein the one or more ventilation holes are in a form of a round hole, a polygonal hole, a strip hole or a grid hole.

6. The energy storage container ventilation system according to claim 1, wherein each ventilation plate is adapted to rotate upward or downward along a rear side edge of the ventilation plate.

7. The energy storage container ventilation system according to claim 6, wherein a maximum rotation angle of the ventilation plate is 90 degrees.

8. The energy storage container ventilation system according to claim 1, wherein the air duct comprises a first air duct and a plurality of second air ducts, and the first air duct is arranged above the plurality of columns of battery racks, and the air outlet of the air conditioner is connected with the first air duct, and each column of the battery racks is connected to one of the second air ducts, and the first air duct is communicated to the second air duct.

9. An energy storage container, comprising the energy storage container ventilation system according to claim 1.

* * * * *